US007159441B2

(12) United States Patent
Challoner et al.

(10) Patent No.: US 7,159,441 B2
(45) Date of Patent: Jan. 9, 2007

(54) CLOVERLEAF MICROGYROSCOPE WITH ELECTROSTATIC ALIGNMENT AND TUNING

(75) Inventors: A. Dorian Challoner, Manhattan Beach, CA (US); Roman C. Gutierrez, La Crescenta, CA (US); Tony K. Tang, Glendale, CA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 10/843,139

(22) Filed: May 11, 2004

(65) Prior Publication Data

US 2004/0237626 A1    Dec. 2, 2004

Related U.S. Application Data

(63) Continuation-in-part of application No. 09/927,858, filed on Aug. 9, 2001, now abandoned.

(51) Int. Cl.
*G01C 19/00*    (2006.01)
(52) U.S. Cl. .................. 73/1.77; 73/504.02; 73/504.04
(58) Field of Classification Search ................. 73/1.37, 73/1.38, 514.15, 504.04, 514.29, 1.77, 504.02
See application file for complete search history.

(56) References Cited

U.S. PATENT DOCUMENTS 4,587,860 A * 5/1986 Audren ......................... 74/5 F (Continued)

FOREIGN PATENT DOCUMENTS

WO    9745702    4/1997

OTHER PUBLICATIONS

Geiger, W, et al., New Designs of Macromachined Vibrating Rate Gyroscopes with Decoupled Oscillation Modes, 1997 International Conference on Solid-State Sensors and Actuators, Jun. 16, 1997, pp. 1129-1132, vol. 2, Chicago, Illinois.

(Continued)

*Primary Examiner*—Hezron Williams
*Assistant Examiner*—Nashmiya Fayyaz
(74) *Attorney, Agent, or Firm*—Ostrager Chong Flaherty & Broitman P.C.

(57)    ABSTRACT

A micro-gyroscope (10) having closed loop output operation by a control voltage ($V_{ty}$), that is demodulated by a drive axis (x-axis) signal $V_{thx}$ of the sense electrodes (S1, S2), providing Coriolis torque rebalance to prevent displacement of the micro-gyroscope (10) on the output axis (y-axis) $V_{thy} \sim 0$. Closed loop drive axis torque, $V_{tx}$ maintains a constant drive axis amplitude signal, $V_{thx}$. The present invention provides independent alignment and tuning of the micro-gyroscope by using separate electrodes and electrostatic bias voltages to adjust alignment and tuning. A quadrature amplitude signal, or cross-axis transfer function peak amplitude is used to detect misalignment that is corrected to zero by an electrostatic bias voltage adjustment. The cross-axis transfer function is either $V_{thy}/V_{ty}$ or $V_{tnx}/V_{tx}$. A quadrature signal noise level, or difference in natural frequencies estimated from measurements of the transfer functions is used to detect residual mistuning, that is corrected to zero by a second electrostatic bias voltage adjustment.

16 Claims, 3 Drawing Sheets

U.S. PATENT DOCUMENTS

| | | | | |
|---|---|---|---|---|
| 6,164,134 A | * | 12/2000 | Cargille | 73/504.02 |
| 6,584,845 B1 | * | 7/2003 | Gutierrez et al. | 73/514.15 |
| 6,675,630 B1 | * | 1/2004 | Challoner et al. | 73/1.77 |
| 6,698,271 B1 | * | 3/2004 | Fell et al. | 73/1.37 |
| 2004/0226370 A1 | * | 11/2004 | Hayworth et al. | 73/504.12 |

OTHER PUBLICATIONS

Song, H. et al., Wafter Level Vacuum Packaged De-coupled Verticle Gyroscope by Proceedings of the IEEE, 13th Annual International Conference on Micro Electro Mechanical Systems, Jan. 23, 2000, pp. 520-524, Miyazaki, Japan.

* cited by examiner

CLOVERLEAF MICROGYROSCOPE WITH ELECTROSTATIC ALIGNMENT AND TUNING

CROSS REFERENCE

The invention described herein is a Continuation-In-Part of application Ser. No. 09/927,858, filed Aug. 9, 2001, now abandoned.

GOVERNMENT INTEREST

The invention described herein was made in the performance of work under a NASA contract, and is subject to the provisions of Public Law 96-517 (35 U.S.C. § 202) in which the Contractor has elected to retain title.

TECHNICAL FIELD

The present invention relates to micro-machined electro-mechanical systems, and more particularly to a MEMS vibratory gyroscope having closed loop output.

BACKGROUND ART

Micro-gyroscopes are used in many applications including, but not limited to, communications, control and navigation systems for both space and land applications. These highly specialized applications need high performance and cost effective micro-gyroscopes.

There is known in the art a micro-machined electromechanical vibratory gyroscope designed for micro-spacecraft applications. The gyroscope is explained and described in a technical paper entitled "Silicon Bulk Micro-machined Vibratory Gyroscope" presented in June, 1996 at the Solid State Sensors and Actuator Workshop in Hilton Head, S.C.

The prior art gyroscope has a resonator having a "cloverleaf" structure consisting of a rim, four silicon leaves, and four soft supports, or cantilevers, made from a single crystal silicon. A metal post is rigidly attached to the center of the resonator, in a plane perpendicular to the plane of the silicon leaves, and to a quartz base plate with a pattern of electrodes that coincides with the cloverleaf pattern of the silicon leaves. The electrodes include two drive electrodes and two sense electrodes.

The micro-gyroscope is electrostatically actuated and the sense electrodes capacitively detect Coriolis induced motions of the silicon leaves. The response of the gyroscope is inversely proportional to the resonant frequency and a low resonant frequency increases the responsivity of the device.

Micro-gyroscopes are subject to electrical interference that degrades performance with regard to drift and scale factor stability. Micro-gyroscopes often operate the drive and sense signals at the same frequency to allow for simple electronic circuits. However, the use of a common frequency for both functions allows the relatively powerful drive signal to inadvertently electrically couple to the relatively weak sense signal.

Residual mechanical imbalance, either stiffness or mass imbalance, of a cloverleaf micro-gyroscope results in misalignment or coupling of drive motion into the output axis. Presently, it is known to correct any misalignment of the mechanical modal axes by electronically rotating the sense and control axes into alignment with the mechanical axes. Electronic alignment is accomplished by transform circuits in the readout electronics that transform the received electrode signal axes and drive axes to the mechanical vibration axes so that a single mode at a time can be sensed and driven. Electronic tuning is achieved by means of phase adjustments in an automatic gain control circuit of the output electronics.

However, electronic alignment, in which the sense and control axes are aligned with the mechanical modal axes results in second harmonics and does not correct electronic mistuning, or asymmetry of the micro-gyroscope. Tuning is typically accomplished by AGC phase-adjustment, for example. This method has limited tuning range for high Q resonators and the tuning will change with variations in damping or temperature. It is known in the art that electrostatic tuning and AGC tuning operate by nulling quadrature amplitude. However, the quadrature amplitude signal more properly relates to misalignment so that when there is no misalignment, there is no quadrature signal, even though there may still be residual mistuning.

Further, inherent in the manufacture of a micro-gyroscope are mechanical imperfections that cause mechanical asymmetry and imbalance in the micro-gyroscope. There is a mechanical stiffness, or inertia, imbalance inherent in a micro-gyroscope that is a result of the way in which the micro-gyroscope is fabricated. This mechanical stiffness, inertia, or asymmetrical imbalance results in dynamic mechanical misalignment torques. There is a need to counteract and correct this imbalance to avoid misalignment and mistuning of the micro-gyroscope during its operation.

SUMMARY OF THE INVENTION

The present invention is a method for electrostatic alignment and tuning of a cloverleaf micro-gyroscope having closed loop operation. Bias voltages are applied to the electrodes to alter the effective spring stiffness governing the resonator vibration. For closed loop output, a differential sense signal (S1–S2) is compensated by a linear electronic filter and directly fed back by differentially changing the voltages on two drive electrodes (D1–D2) to rebalance Coriolis torque, suppress quadrature motion and increase the damping of the sense axis resonance. The resulting feedback signal is demodulated in phase with the drive axis signal (S1+S2) to produce a measure of the Coriolis force and, hence, the inertial rate input.

The micro-gyroscope and method of alignment and tuning of the present invention first detects residual mechanical imbalance, or misalignment, of the cloverleaf micro-gyroscope by demodulation of the feedback signal with the drive axis signal and detecting a quadrature signal amplitude. Alternatively, the amplitude of a cross axis transfer function from the drive axis control voltage, $V_{tx}$, to the output axis sense voltage, $V_{thy}$, i.e. $V_{thy}/V_{txo}$, or from the output axis control voltage, $V_{ty}$, to the drive axis sense voltage, $V_{thx}$, i.e., $V_{thx}/V_{ty}$ is indicative of mechanical misalignment. The detected misalignment is corrected to zero by applying an electrostatic bias adjustment to at least one electrode rather than the electronic signal decoupling that is accomplished by electronic alignment methods used in the prior art. After such electrostatic alignment, any residual in-phase demodulated rate bias may be nulled by electronically coupling a component of drive axis torque into the output axis.

According to the present invention, residual mistuning is detected by detecting a quadrature signal noise level, or a mismatch between the drive axis and output axis natural resonance frequencies estimated, respectively from the two direct transfer functions, $V_{thx}/V_{tx}$ and $V_{thy}/V_{ty}$. These transfer functions can be measured open loop or closed loop by summing a pseudo-random noise test signal with the normal output or drive axis control signal and correlating the output axis or drive axis sensed motion with this test signal. Mistuning is corrected by applying an electrostatic bias adjustment to at least one electrode in the electrode plane. The quadrature amplitude is used as an indication of misalignment and quadrature noise level, or a natural resonance frequency and amplitude estimates from a transfer function are used as a mistuning indicator for electrostatic adjustment of alignment and tuning.

Electrostatic alignment and tuning is accomplished by applying bias voltages to the electrodes to alter the effective spring stiffness governing the resonator vibration so that the mechanical vibration axes become aligned with the electrode drive and sense axes.

It is an object of the present invention to improve closed loop micro-gyroscope performance. It is another object of the present invention to improve the accuracy of micro-gyroscope alignment and tuning.

It is a further object of the present invention to provide electrostatic alignment and tuning for closed-loop operation of a vibratory micro-gyroscope. It is still a further object of the present invention to use the quadrature amplitude or a cross-axis transfer function amplitude as an indication of misalignment. It is yet a further object of the present invention to use quadrature noise level, or difference in natural resonance frequencies estimated from direct transfer function measurements as a tuning indicator. Yet a further object of the present invention is to provide independent control of alignment and tuning for a closed loop micro-gyroscope.

Other objects and features of the present invention will become apparent when viewed in light of the detailed description of the preferred embodiment when taken in conjunction with the attached drawings and appended claims.

BEST MODE(S) FOR CARRYING OUT THE INVENTION

The method of the present invention is applicable to a closed loop micro-gyroscope. In the preferred embodiment, the closed loop micro-gyroscope is described in conjunction with FIGS. 1 through 3. For example purposes, and for simplicity, the closed loop control of the preferred embodiment will be described in accordance with a cloverleaf micro-gyroscope having four electrodes.

Figure 1:
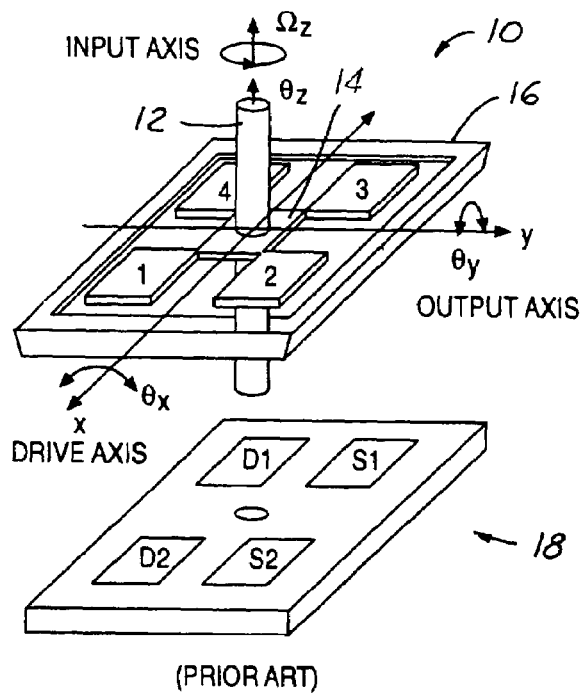
FIG. 1 is an exploded view of a prior art vibratory micro-gyroscope having four electrodes.

FIG. 1 is an exploded view of the micro-gyroscope 10. The cloverleaf micro-gyroscope 10 has an affixed central proof mass, or post 12 rigidly attached to a resonator 14 having a cloverleaf shape with petals labeled 1, 2, 3, and 4. The cloverleaf resonator 14 is elastically suspended from an outer frame 16. The resonator defines a resonator plane and the central proof mass 12 is perpendicular to the resonator plane.

A set of at least four electrodes 18 define an electrode plane. The electrodes 18 are located under the resonator 14. The electrodes function to actuate the resonator and to sense capacitance on the resonator 14. The electrodes are large parallel plate capacitors. The electrodes define an electrode plane that is separated from the resonator plane by a capacitive gap.

Drive electrodes D1 and D2 actuate movement of the resonator 14 and sense electrodes S1 and S2 sense capacitance. A set of axes are labeled x, y and z to describe the operation of the micro-gyroscope. The x-axis is also known as the drive axis. The y-axis is also known as the output, or sense axis. And the z-axis is also known as the input axis.

The electrodes initiate a rocking motion of the central proof mass 12 about the x-axis that actuates the micro-gyroscope 10. The rocking motion is accomplished by applying electrostatic forces to petals 1 and 4 by applying a voltage to the drive electrodes, D1 and D2. For a steady inertial rate, $\Omega$, along the z-axis or input axis, there will be a displacement about the y-axis, or output axis that can be sensed by the differential output of the sensing electrodes, S1–S2 or $V_{thy}$. The displacement about the y-axis is due to the influence of a rotation induced Coriolis force that needs to be restrained by a counteracting force.

In a cloverleaf micro-gyroscope the resonator 14 that is suspended from the outer frame 16 has a planar structure. The four electrodes 18 define the electrode plane, which is adjacent the resonator plane. The present invention corrects misalignment and mistuning by zeroing the misalignment and mistuning using out-of-plane forces, or torques, produced by bias adjustments to a particular electrode in the electrode plane. By applying an electrostatic bias adjustment to one of the electrodes in the electrode plane, a torque is generated that counteracts a mechanical cross-coupling spring force that is misalignment caused by the fabrication, or manufacture, of the micro-gyroscope.

In fabricating a micro-gyroscope it is inevitable that asymmetry, also called mistuning, and imbalance, also called mechanical misalignment or rocking imbalance stiffness $K_{xy}$, or inertia $J_{xy}$, of the resonator will occur. It is not yet possible to fabricate a micro-gyroscope without mechanical error. Therefore, in the present invention, electrostatic stiffness is introduced to counteract the inherent mistuning and alignment, by applying an electrostatic bias voltage to an electrode in the electrode plane. A bias voltage applied to an electrode in the electrode plane produces cross-coupling electrostatic spring stiffness, $K^e_{xy}$. This, in turn, generates an electrostatic torque, $T_y$, in response to a displacement about the x-axis, caused by the cross coupling electrostatic spring force, which counteracts the dynamic effect of rocking imbalance stiffness $K_{xy}$ or rocking inertia imbalance, $J_{xy}$. The motion of the post on the y-axis is thereby nulled. An electrostatic bias adjustment to an electrode thus creates a stiffness torque that counteracts any mechanical stiffness or inertia dynamic imbalance torque.

Figure 2:
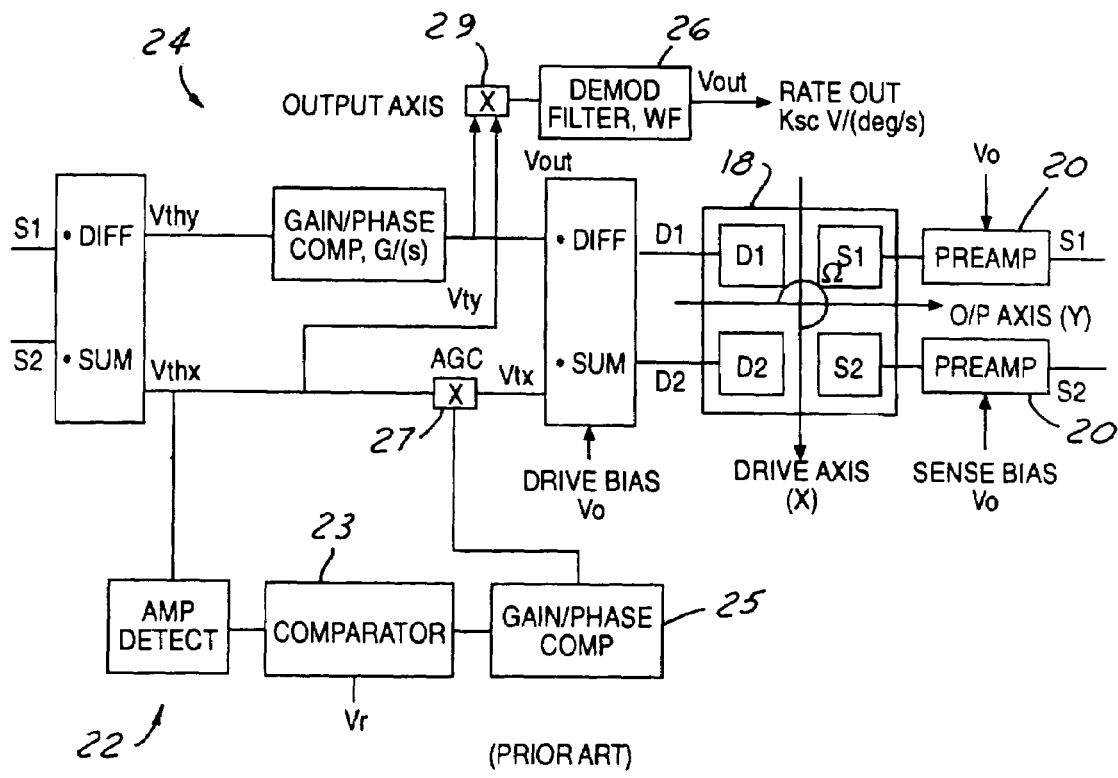
FIG. 2 is a block diagram of a prior art closed-loop micro-gyroscope.

Referring now to FIG. 2, the wide-band closed-loop operation of the micro-gyroscope will be described. The closed-loop control circuit nulls displacement about the y-axis through linearized electrostatic torques $T_x$ and $T_y$. The electrostatic torques, $T_x$ and $T_y$, are proportional to control voltages $V_{tx}$ and $V_{ty}$. The two drive electrodes D1 and D2 produce linearized electrostatic torques about the x and y axes that are proportional to control voltages $V_{tx}$ and $V_{ty}$. D1 and D2 are defined as:

$$D1 = V_o - V_{ty} + V_{tx}$$

and $$D2 = V_o + V_{ty} + V_{tx}$$

where $V_o$ is a bias voltage.

The linearized electrostatic torques about the x and y axes are defined as:

$$T_x = K_T V_{tx}$$

$$T_y = K_T V_{ty}$$

where the torque constant $K_T$ is:

$$K_T = [2r_o C_o V_o]/[d_o]^{-1}$$

$r_o$ is the offset from x or y axis to the control, or drive, electrode center, $C_o$ is the capacitance of one control electrode, $V_o$ is the bias voltage, and $d_o$ is electrode gap which is the separation between the electrode plane and the resonator plane.

The control voltage $V_{tx}$ provides for automatic gain control of the drive amplitude. The control voltage $V_{ty}$ provides for Coriolis torque re-balance. The output axis (y-axis) gain and phase compensation are selected based on computed or measured transfer functions, G(s), from $V_{ty}$ to $V_{thy}$. The reference signal used to demodulate $V_{ty}$ is $V_{thx}$ which is in phase with the drive axis rate signal, $\omega_x$.

Referring still to FIG. 2, the closed loop operation of the micro-gyroscope of the present invention measures the inertial rate, $\Omega$ around the z-axis. Signals s1 and s2 are output from pre-amplifiers 20 that are attached to the sense electrodes S1 and S2.

The micro-gyroscope is set in motion by a drive loop 22, that causes the post to oscillate around the x-axis. The post rocks and has a rate of rotation about the x-axis. D1 and D2 apply voltages in phase therefore, they push and pull the resonator (not shown in FIG. 2) creating a torque, $T_x$, on the x-axis.

When there is no inertial rate on the z-axis, there is no differential motion on S1 and S2. In this case, $V_{thy} = S1 - S2 = 0$. S1 and S2 are in phase and indicate a rotation around the x-axis. $V_{thx} = S1 + S2$ is amplitude and gain phase compensated in an automatic gain control loop 22, 25, 27 to drive $V_{thx}$ to $V_{tx}$. An amplitude reference level, $V_r$, is compared with a comparator 23 to the output of the amplitude detector 22 that determines the amplitude of $V_{thx}$. The resulting amplitude error is gain and phase compensated 25 and applied as a gain to an automatic gain control multiplier 27. A drive voltage $V_{tx}$ proportional to $V_{thx}$ is thus determined that regulates the amplitude of the vibration drive.

When an inertial rate is applied, it creates a difference between S1 and S2 equal to $V_{thy}$. In the prior art $V_{thy}$ was merely sensed open loop as being proportional to the rate of the micro-gyroscope. In the present invention $V_{thy}$ is gain and phase compensated based on a computed, or measured, transfer function G(s). The resulting closed loop output voltage $V_{ty}$ generates an electrostatic torque $T_y$ to balance the torque that results from the Coriolis force, thereby nulling the motion on the output, or y, axis.

To obtain the micro-gyroscope output signal, $V_{out}$, proportional to an input rate $\Omega$, the rebalance torque voltage $V_{ty}$ is demodulated with the drive reference signal $V_{thx}$ by an output axis demodulator 29 and then processed through a demodulator and filter circuit 26. The DC component of the output signal of the demodulator, $V_{out}$, is proportional to the rotation rate $\Omega$.

In the above-described closed loop control, if the drive axis creates a disturbance on the y-axis, it is also sensed using the above described demodulation scheme for the output. The closed loop operation prevents any rocking on the y-axis by feedback 24 applied by differentially feeding D1 and D2. D1 and D2 are responsive to $V_{ty}$ as well as $V_{tx}$.

$V_{thx}$ and $V_{thy}$ are defined by:

$$V_{thx} = S1 + S2$$

$$V_{thy} = S1 - S2$$

Both $V_{thx}$ and $V_{thy}$ are directly proportional to the drive axis rate, i.e. $V_{thx} = K_\omega - \omega_x$ and output axis rate, $\omega_x = K_\omega \Theta_x$ where $K_\omega$ is de $$K_\omega = [2r_o C_o V_o R]/[d_o]^{-1}$$

and R is the transimpedance from the preamplifiers 20.

The cloverleaves of the resonator and the substrate beneath S1 and S2 electrodes are well grounded at the drive frequency, capacitive drive feedthrough is reduced and stability margins are improved.

Stiffness is a restorative force typically accomplished by applying a spring force. In the present invention, stiffness is accomplished by applying an electrostatic bias voltage to an electrode in the electrode plane. During operation of the micro-gyroscope, Coriolis force causes rocking displacement of the post about the y-axis. The post is perpendicular to the x-y plane, and also to the electrode plane, as shown in FIG. 1. A cross coupling electrostatic spring force applied to an electrode offset in the x-y plane generates an electrostatic torque in response to displacement about the x axis, and nulls motion on the y axis.

Figure 3:
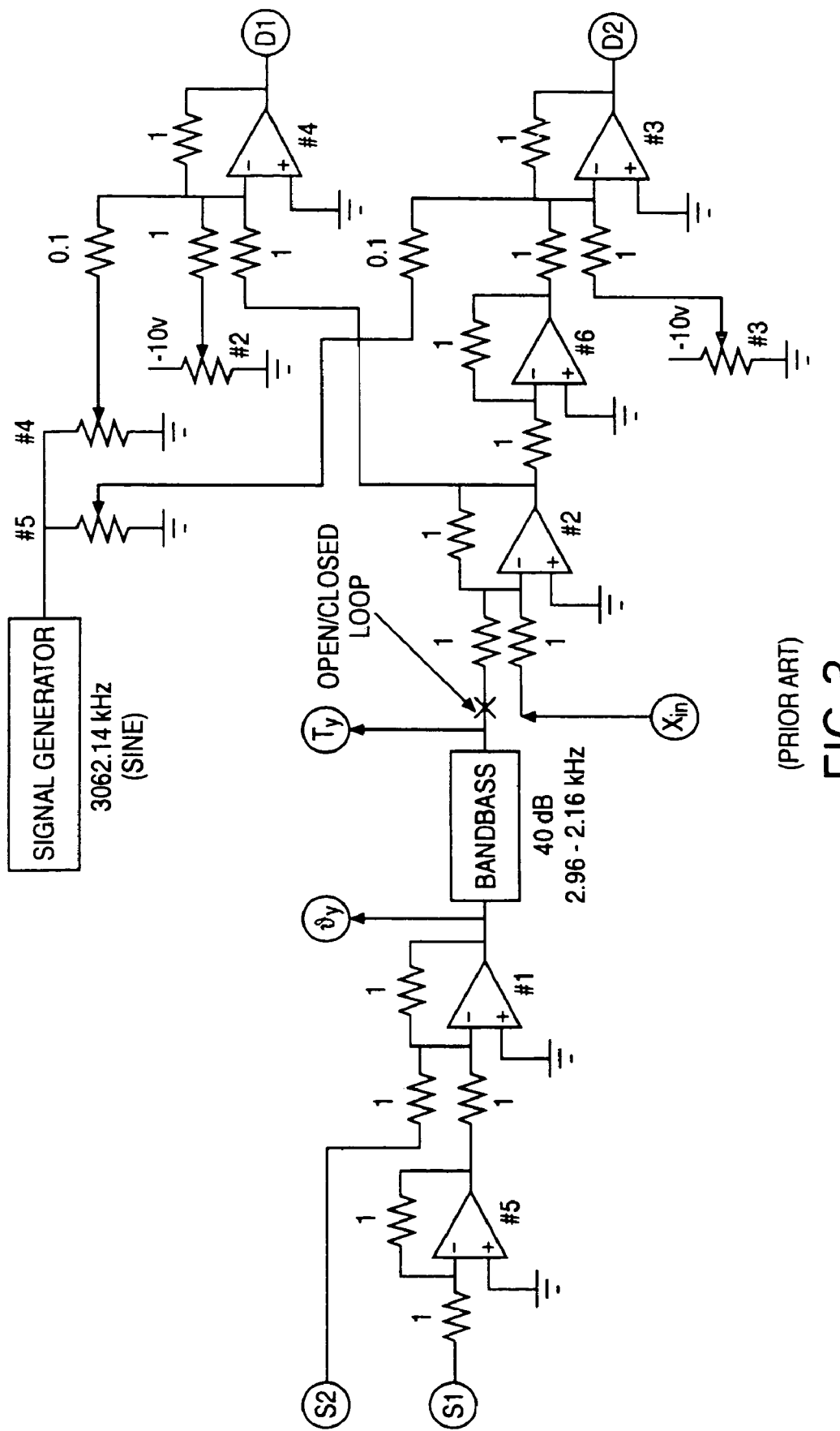
FIG. 3 is an example of a prior art circuit schematic for closed loop sense/open loop drive operation.

FIG. 3 is an example of a schematic for closed loop sense/open loop drive operation. It should be noted that in the configuration shown in FIG. 3, the two sense signals S1 and S2 are differenced, filtered and amplified. The filter helps to remove residual second harmonics and adjusts loop phase to provide stable closed loop operation. The following amplifiers serve to combine the closed loop output feedback signal with the open loop drive signal providing the correct signals to electrodes D1 and D2. Rebalance of the Coriolis force and robust damping of the output axis resonance is provided by this wideband closed loop design.

Figure 4:
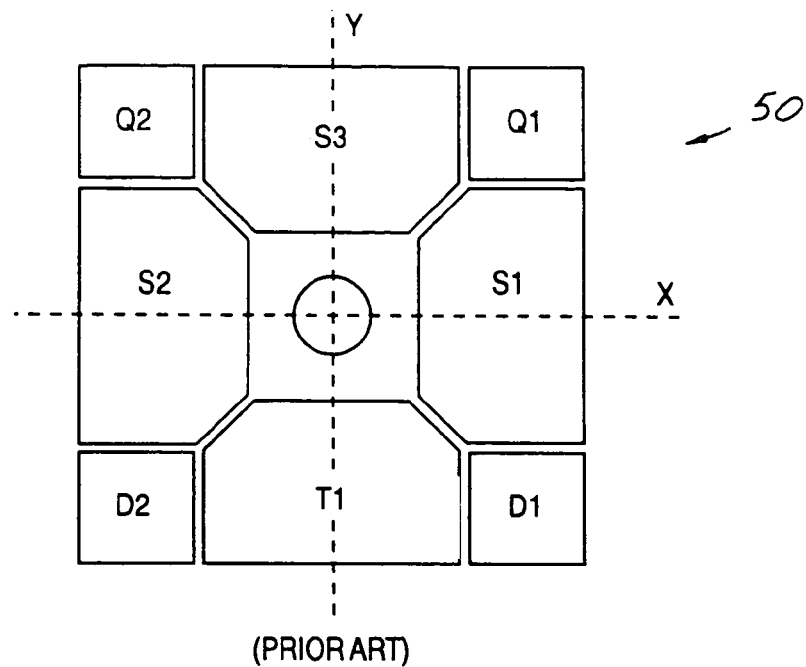
FIG. 4 is an exemplary electrode arrangement for the method of electrostatic alignment and tuning according to the present invention, the electrode arrangement includes eight electrodes.

The method of the present invention is also described herein with reference to an eight-electrode micro-gyroscope 100 shown in FIG. 4. The closed loop control is very similar to that described in conjunction with the four electrode design in FIGS. 1–3. However, in a micro-gyroscope having eight electrodes, there are obviously four additional electrodes, Q1, Q2, T1 and S3. D1 and D2 are used differentially for closed loop control on the y-axis and in common mode for x-axis control. S1 and S2 are dedicated to differential y-axis output sensing. S3 senses the motion of the drive, or x-axis, and T1 is used for tuning on x-axis. Q1 and Q2 are used to align the micro-gyroscope.

The micro-gyroscope has an inertia matrix J, a stiffness matrix, K and a damping matrix D which define the rotational motion about the x and y axes. In operation, the micro-gyroscope is driven about the x-axis in order to sense inertial rate about the z-axis through Coriolis coupling of the driven motion to the sense, or y, axis. As described above, in the preferred embodiment of the present invention, the sense axis motion is nulled by a linear feedback torque $u_y$, where the torque is a measure of the inertial rate $\Omega$.

It is also preferred that the micro-gyroscope have closely tuned operation. Closely tuned operation has a drive frequency that is selected close to the sense axis natural resonant frequency for maximum mechanical gain. Symmetrical design and accurate construction of the microgyroscope are important so that the two rocking mode natural frequencies are similar. A self-resonant drive about the x-axis, for example an AGC loop, will permit large drive motion with small torque controls.

It is not presently known how to fabricate a microgyroscope with atomic precision. Therefore, it is inevitable that asymmetry and imbalance in the matricies J, D, and K will lead to false Coriolis rate indications. The present invention independently controls alignment and tuning of the micro-gyroscope. Control torque, $u_y$, about the y-axis will be detected with zero inertial rate output.

Figure 5:
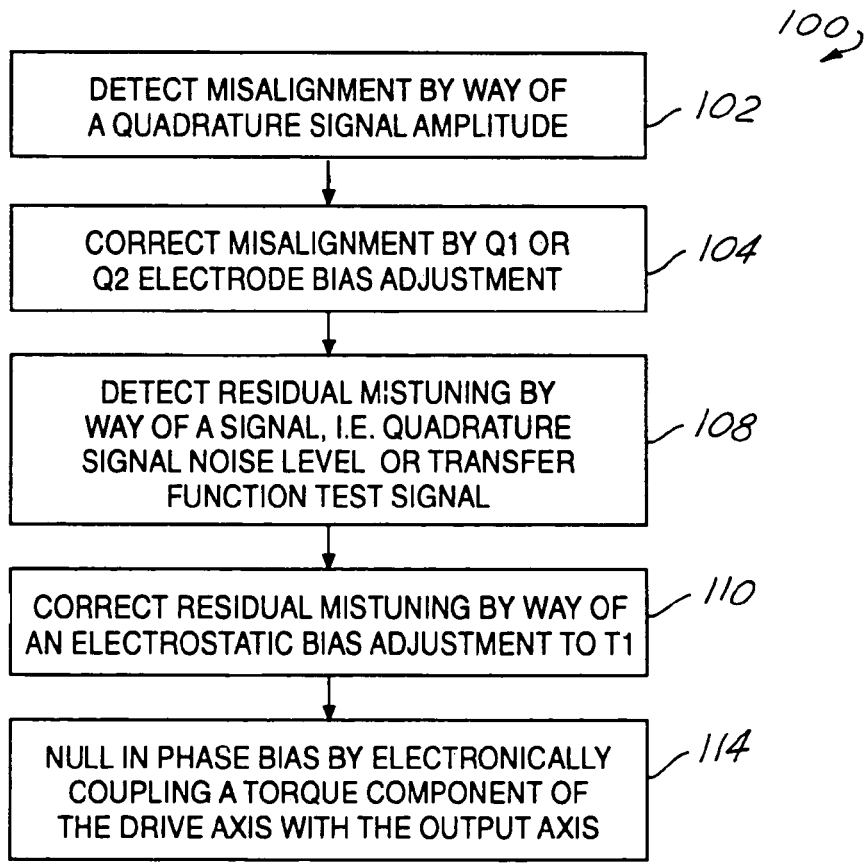
FIG. 5 is a flowchart of the method for electrostatic alignment and tuning according to the present invention.

The method 100 of the present invention is described with reference to FIG. 5. Misalignment is detected 102 by the presence of a quadrature signal amplitude on $V_{out}$. The misalignment is corrected 104 by an electrostatic bias adjustment to electrode Q1 or Q2. Misalignment of the cloverleaf microgyroscope is detected by demodulation of the feedback signal with the drive axis signal, thereby detecting a quadrature signal amplitude. In the alternative, the amplitude of a cross-axis transfer function from the drive axis control voltage, $V_{tx}$, to the output axis sense voltage, $V_{thy}$, the transfer function being $V_{thy}/V_{tx}$, is indicative of mechanical misalignment. Likewise, the amplitude of the cross-axis transfer function from the output axis control voltage, $V_{ty}$, to the drive axis sense voltage, $V_{thx}$, i.e. $V_{thx}/V_{ty}$, is indicative of mechanical misalignment.

The detected mechanical misalignment is corrected to zero by applying an electrostatic bias adjustment to at least one electrode. After such electrostatic alignment, any residual in-phase demodulated rate bias may be nulled by electronically coupling a component of the drive axis torque into the output axis.

Residual mistuning is detected 108 and corrected 110 by way of an electrostatic bias adjustment to electrode T1. The detection 108 is accomplished by noting the presence of a quadrature signal noise level or by detecting a mismatch between the drive axis natural resonant frequency and the output axis natural resonant frequency. This is determined directly from the two direct transfer functions, $V_{thx}/V_{tx}$ and $V_{thy}/V_{ty}$. The direct transfer functions can be measured open loop or closed loop by summing a pseudorandom noise test signal with the normal output or drive axis control signal and correlating the output axis or drive axis sensed motion with the test signal. Mistuning is corrected 110 by applying, an electrostatic bias adjustment to at least one electrode in the electrode plane.

In the present invention, the quadrature amplitude is used as an indication of misalignment and quadrature noise level, or natural resonance frequency and amplitude estimates from a direct transfer function are used as mistuning indicators.

In the following description of the present invention, the motion about the y-axis is regarded to be infinitesimal, i.e. perfect feedback, and drive axis motion about the x-axis is described as:

$$\theta_s = \theta_{xo} \sin(\omega_o t)$$

where $\omega_o$ is the operating frequency of the drive and $\theta_{xo}$ is the drive amplitude.

Small angle motion of a rocking mode gyroscope with inertia and stiffness misalignment is governed by:

$$\left( s^2 \begin{bmatrix} J_{xx} & J_{xy} \\ J_{yx} & J_{yy} \end{bmatrix} + s \begin{bmatrix} D_{xx} & D_{xy} \\ D_{yx} & D_{yy} \end{bmatrix} + \begin{bmatrix} K_{xx} & K_{xy} \\ K_{yx} & K_{yy} \end{bmatrix} \right) \begin{bmatrix} \vartheta_x \\ \vartheta_y \end{bmatrix} = \begin{bmatrix} T_x \\ T_y \end{bmatrix}$$

where output axis torque $T_y = T_c + u_y + \delta_T T_d$. The Coriolis torque is $T_c = -J_{yy} 2k\Omega s\theta_x$, k is the micro-gyroscope angular gain, the wideband control is $u_y = -G(s)(\theta_y + \delta_R \theta_x)$ and the drive torque $T_d = D_x s\theta_x$ is at a drive resonance of $\omega_o = (K_{xx}/J_{xx})^{1/2}$.

Analysis of the small motion on the y-axis is described hereinafter. The equation for y-axis motion has the form:

$$F(s)\theta_y + H(s)\theta_x = -G(s)\theta_y - G(s)\delta_R\theta_x + T_c(s)\theta_x + L(s))\delta_T\theta_x$$

$$\vartheta_y = \frac{-H(s) - G(s)\delta_R + L(s)\delta_T + T_c(s)}{F(s) + G(s)} \vartheta_x$$

$$u_y = -G(s)\vartheta_y - G(s)\delta_R\vartheta_x$$

$$u_y = \frac{G(s)H(s) + L(s)\delta_T + T_c(s)}{F(s) + G(s)}\vartheta_x + G(s)\left[\frac{G(s)\delta_R}{F(s) = G(s)} - \delta_R\right]\vartheta_x$$

$$u_y = \frac{-G(s)}{F(s) + G(s)}[-H(s) + L(s)\delta_T + T_c(s) + \delta_R F(s)]\vartheta_x$$

With properly compensated transimpedance buffers, electronic amplification and biased electrostatic drive (i.e., FIG. 3), it is possible to provide loop compensation G(s) approximately equal to sK, so that $u_y$ can be expanded as:

$$u_y = \frac{sK}{J_{yy}s^2 + (K + D_{yy})s + K_{yy}}[(J_{yx} - \delta_R J_{yy})s^2 +$$

$$(J_{yy}2k\Omega + D_{yx} - \delta_R D_{yy} - \delta_T D_{xx})s + (K_{yx} - \delta_R K_{yy})]\vartheta_x$$

$$u_y = \frac{1/(1+\delta_c)}{1 + \frac{J_{yy}s^2 + K_{yy}}{K(1+\delta_c)s}} \cdot \left[(J_{yy}2k\Omega + D_{yx} - \delta_R D_{yy} - \delta_T D_{xx}) + \right.$$

$$\left. \frac{(J_{yx} - \delta_R J_{yy})s^2 + (K_{yx} - \delta_R s K_{yy})}{s}\right] s\vartheta_x$$

where $\delta_c = D_{yy}/K$. For steady state drive operation at $s = j\omega_o$, the feedback torque becomes:

$$u_y = \frac{1/\left(1 + \frac{D_{yy}}{K}\right)}{1 + \frac{-J_{yy}\omega_o^2 + K_{yy}}{K(1+\delta_c)j\omega_o}} \cdot \left[(J_{yy}2k\Omega + D_{yx} - \delta_R D_{yy} - \delta_T D_{xx}) + \right.$$

$$\left. \frac{-(J_{yx} - \delta_R J_{yy})\omega_o^2 + (K_{yx} - \delta_R K_{yy})}{j\omega_o}\right] j\omega_o \vartheta_x$$

which can be approximated as:

$$u_y \approx (1-\delta_c)(1 - j\phi_c)(I_o + Q_o j)s\theta_x$$

$$u_y \approx (1-\delta_c)[(I_o + Q_o\phi_c) + j(Q_o - I_o\phi_c)]s\theta_x$$

where $K = K_\omega K_c K_T$ can be set by compensator gain, $K_c$ to achieve closed loop bandwidth, $\omega_c = K/J_{yy}/2 = \omega_{OL}/\delta_c$, and open loop bandwidth, $\omega_{OL} = D_{yy}/J_{yy}/2$ $\phi_c=(J_{yy}\omega_o^2-K_{yy})/(K(1+\delta_c)\omega_o)$ $Q_o=(-(J_{yx}-\delta_R J_{yy})\omega_o^2+(K_{yx}-\delta_R K_{yy}))/\omega_o$ $I_o=(J_{yy}2k\Omega+D_{yx}-\delta_R D_{yy}-\delta_T D_{xx})$ Demodulation of feedback voltage $V_{ty}$, which is proportional to $u_y$, with drive reference $V_{thx}$ produces an output proportional to $\Omega$ plus an in-phase rate bias term due to the real component of $u_y$, and is given by:

$\Omega_{bi}=(D_{yx}-\delta_R D_{yy}-\delta_T D_{xx}+\phi_c(-(J_{yx}-\delta_R K_{yy})\omega_o)/2KJ_{yy}$ Demodulation of feedback voltage $V_{ty}$, with a signal in quadrature to $V_{thx}$ produces a quadrature rate bias, which is given by:

$\Omega_{bq}=(-\phi_c(D_{yx}-\delta_R D_{yy}-\delta_T D_{xx})+(-(J_{yx}-\delta_R J_{yy})\omega_o^2+(K_{yx}-\delta_R K_{yy}))/\omega_o)/2KJ_{yy}$ Given the above analysis of the small motion on the y-axis, the method of the present invention sets the sensor misalignment to zero, $\delta_R=0$ electronically, and then electrostatically aligns the micro-gyroscope by introducing an electrostatic cross coupling spring $K^e_{xy}$ to cancel the misalignment torque. For example, $T_y=K^e_{xy}\theta_y=(J_{xx}\omega_y^2+K_{xy})\theta_y$. The remaining in-phase bias component of $\Omega_{bi}$ can also be nulled. This can be accomplished by introducing a relative gain mismatch $\delta_T\neq 0$ on the control voltage to each of the drive electrodes D1 and D2. This compensates for the false rate arising from finite modal damping and misalignment of the damping axes, i.e. set $D_{xy}-\delta D_{xx}=0$. The compensation also applies to any systematic changes in damping affecting both axes, for example, as may-be caused by bulk temperature changes.

For a four-electrode cloverleaf micro-gyroscope like the one shown in FIG. 1, the cross-coupled electrostatic stiffness can be introduced by applying more or less bias voltage to one of the drive electrodes, D1 or D2. Tuning the four-electrode cloverleaf micro-gyroscope The in-phase rate bias error is also nulled as described above, by applying a relative gain mismatch to one of the drive electrodes, D1 or in the preferred closed loop operation of the present invention, the compensation is set such that G(s)=sK and K is maximized to be consistent with loop stability. In such a case, dependence on scale factor and phase shift on the mechanical response is minimized. Furthermore, with fully tuned operation, $\omega_{nx}^2=K_{xx}/J_{xx}=\omega_{ny}^2 K_{yy}/J_{yy}=\omega_o^2$ and there is no closed loop phase error, $\phi_c=0$. For tuned conditions, maximum mechanical gain and maximum loop gain occur. Therefore, noise due to input electronic noise is minimized.

For an eight-electrode design, as shown in FIG. 4, electrostatic cross-coupled stiffness, $K^e_{xy}$ for alignment purposes can be introduced by modification of the bias voltage of either Q1 or Q2. Electrostatic modification of net $K_{xx}$ for tuning purposes can be independently accomplished by increasing or decreasing the bias voltage T1 as well.

For example, if $\omega_{nx} > \omega_{ny}$, then the bias voltage applied to T1 is made larger than the voltage applied to S1 and S2. The total stiffness is the elastic stiffness plus the electrostatic stiffness. The total stiffness about the x-axis is lowered so that $\omega_{nx}$ is also lowered and brought into tune with $\omega_{ny}$. In this regard, the present invention provides a tuning method for vibratory micro-gyroscopes in which one of the bias voltages is increased or decreased until a minimum value of the rms noise is obtained or until the drive and output axis resonance frequencies, estimated from direct transfer functions $V_{thx}/V_{tx}$ and $V_{tny}/V_{ty}$ are nulled, indicating tuning. The frequency at the maximum of each direct transfer function is indicative of the respective axis natural frequency. In the alternative, a pseudorandom test signal may be utilized to generate the transfer functions with either open loop or closed loop operation of the microgyroscope.

For the eight-electrode design, a bias voltage on either Q1 or Q2 will introduce cross axis electrostatic stiffness. To align the gyroscope, one of these, say Q1 bias, is adjusted until the quadrature amplitude is nulled. $\delta_T$ is adjusted, in the absence of input rate, until the rate output bias is nulled.

To independently tune the micro-gyroscope according to the present invention, the electrostatic tuning bias, electrode T1, is adjusted until closed loop quadrature or in-phase noise in the absence of inertial rate input, or a difference in estimated natural resonance frequencies from direct transfer functions, or another tuning signal, is minimized.

While particular embodiments of the present invention have been shown and described, numerous variations and alternate embodiments will occur to those skilled in the art. Accordingly, it is intended that the invention be limited only in terms of the appended claims.

What is claimed is:

1. A method for aligning a cloverleaf micro-gyroscope having a resonator having an affixed central proof mass, the resonator being elastically suspended in an x-y plane defining a resonator having rocking inertia and rocking suspension, at least four electrodes in an electrode plane adjacent the x-y plane, the at least four electrodes for actuating and sensing a rocking motion of the resonator rocking suspension, and closed loop control of the resonator rocking motion about the x and y axes, said method comprising the steps of:
    detecting mechanical misalignment in rocking vibration of the resonator in the x-y plane; and
    nulling the mechanical misalignment of the resonator to zero by applying an electrostatic bias adjustment to an electrode of the at least four electrodes in the electrode plane to produce a cross-coupling spring stiffness, $K^e_{xy}$ and resulting dynamic alignment torques to cancel dynamic mechanical misalignment torques caused by misalignment of the resonator rocking suspension and rocking inertia in the x-y plane.

2. The method as claimed in claim 1 wherein the step of detecting mechanical misalignment further comprises, detecting mechanical misalignment by sensing a quadrature signal amplitude obtained by demodulation of a signal of the y-axis using a signal in quadrature to an x-axis rate signal.

3. The method as claimed in claim 1 further comprising the step of nulling an in-phase bias.

4. The method as claimed in claim 3 wherein the step of nulling an in-phase bias further comprises electronically coupling a torque component of the x-axis with the y-axis.

5. A method for tuning a cloverleaf micro-gyroscope having a resonator having an affixed central proof mass, the resonator being elastically suspended in an x-y plane defining a resonator having rocking inertia, mechanical stiffness and rocking suspension about the x and y axes, at least four electrodes in an electrode plane adjacent the x-y plane, the at least four electrodes for actuating and sensing a rocking motion of the resonator in the x-y plane, and closed loop control of the rocking motion in the x-y plane, said method comprising the steps of:
    detecting residual mistuning that is a result of mechanical asymmetry of the resonator rocking inertia or mechanical stiffness by detecting a predefined signal at an output of the micro-gyroscope; and correcting the residual mistuning to zero by applying an electrostatic bias adjustment to an electrode of the at least four electrodes in the electrode plane to produce an electrostatic stiffness and dynamic torque asymmetry that counteracts a mismatch in dynamic torques due to the resonator rocking inertia or mechanical stiffness.

6. The method as claimed in claim 5 wherein the step of detecting a predefined signal further comprises detecting a quadrature signal noise level.

7. The method as claimed in claim 5 wherein the step of detecting a predefined signal further comprises calculating the difference in estimated resonance frequencies of two direct transfer functions.

8. A method for independently aligning and tuning a cloverleaf micro-gyroscope having a resonator having an affixed central proof mass, the resonator being elastically suspended in an x-y plane defining a resonator having rocking inertia and rocking suspension, at least four electrodes in an electrode plane adjacent the x-y plane, the electrodes for actuating and sensing a rocking motion of the resonator in the x-y plane, and closed loop control of the resonator rocking motion about the x and y axes, said method comprising the steps of:

detecting a mechanical misalignment in rocking vibration of the resonator in the x-y plane;

nulling the effect of the mechanical misalignment of the resonator rocking vibration in the x-y plane to zero by applying an electrostatic bias adjustment to an electrode of the at least four electrodes to produce a cross-coupling electrostatic spring stiffness $K^e_{xy}$ and resulting dynamic alignment torques to cancel the mechanical misalignment arising from the misalignment of the resonator rocking inertia and rocking suspension in the x-y plane;

detecting a residual mistuning that is a result of mechanical asymmetry by detecting a predefined signal at an output of the micro-gyroscope; and correcting the residual mistuning by applying an electrostatic bias adjustment to an electrode of the at least four electrodes to produce an electrostatic stiffness that counteracts a mismatch of dynamic torques due to mechanical asymmetry of the resonator rocking inertia or rocking suspension.

9. The method as claimed in claim 8 wherein the step of detecting a predefined signal further comprises detecting a quadrature signal noise level.

10. The method as claimed in claim 8 wherein the step of detecting a predefined signal further comprises measuring a transfer function.

11. The method as claimed in claim 8 further comprising the step of nulling in-phase bias.

12. The method as claimed in claim 8 wherein the step of correcting the residual mistuning to zero further comprises the step of adjusting a total stiffness of said micro-gyroscope.

13. The method as claimed in claim 8 wherein the micro-gyroscope closed loop control further comprises: using electrodes in addition to the at least four electrodes as sensors and actuators for the step of nulling the effect of the mechanical misalignment of the resonator rocking vibration and for the step of correcting the residual mistuning.

14. The method as claimed in claim 8 further comprising the step of applying a bias voltage to an electrode of the at least four electrodes that is different from a bias voltage applied to another electrode of the at least four electrodes.

15. The method as claimed in claim 8 further comprising the step of introducing a relative gain mismatch, $\delta_T \neq 0$, to each electrode of the at least four electrodes.

16. The method as claimed in claim 8 further comprising the step of maximizing a stiffness matrix K.

* * * * *